United States Patent [19]
Shiraishi et al.

[11] Patent Number: 5,201,819
[45] Date of Patent: Apr. 13, 1993

[54] DRIVING WHEEL ELEVATING APPARATUS IN SELF-PROPELLED TRUCK

[75] Inventors: Itsuo Shiraishi, Ebina; Minoru Otuka, Zama, both of Japan

[73] Assignee: Yugen Kaisha Takuma Seiko, Kanagawa, Japan

[21] Appl. No.: 769,663

[22] Filed: Oct. 2, 1991

[30] Foreign Application Priority Data

May 10, 1990 [JP] Japan ................................. 2-120456

[51] Int. Cl.<sup>5</sup> ............................................. B62D 1/24
[52] U.S. Cl. ................................. 180/168; 180/240.2; 280/43.17; 280/43.23
[58] Field of Search .................. 180/167, 168, 169, 43, 180/65.1, 24.02; 280/4.6, 6.12, 43.17, 43.18, 43.19, 43.2, 43.21, 43.22, 43.23, 96.3, 92

[56] References Cited

U.S. PATENT DOCUMENTS

| | | | |
|---|---|---|---|
| 4,515,235 | 5/1985 | Yamamoto et al. | 180/168 |
| 4,711,316 | 12/1987 | Katou et al. | 180/168 |
| 4,750,579 | 6/1988 | Farl et al. | 280/43.18 |
| 4,805,710 | 2/1989 | Farl et al. | 280/43.18 |

FOREIGN PATENT DOCUMENTS 1039936 9/1958 Fed. Rep. of Germany ... 280/43.18

Primary Examiner—Richard M. Camby
Attorney, Agent, or Firm—Browdy and Neimark

[57] ABSTRACT

A self-propelled bogie or truck to automatically travel along guide tape attached to a floor surface has a base portion provided with plural non-driving wheels attached to a lower face thereof, an elevating plate moving vertically relative to the base portion, driving wheels attached to the elevating plate at levels of stable relative height positions, an electric motor attached to the base portion, a pressure rod adapted to vertically move when the motor rotates, and compression springs placed between the pressure rod and the elevating plate. When the driving wheels move to the upper storage position, the springs extend, however when the driving wheels move to the lower running position, the springs are compressed giving a ground contacting pressure to the driving wheels.

3 Claims, 8 Drawing Sheets

DRIVING WHEEL ELEVATING APPARATUS IN SELF-PROPELLED TRUCK

FIELD OF THE INVENTION

The present invention relates to a driving wheel elevating apparatus in a self-propelled truck automatically running or travelling along an optical or magnetic guide tape placed on a floor surface.

BACKGROUND OF THE INVENTION

A conventional self-propelled truck or bogie truck shown in FIG. 11 is well-known, which truck has a base portion C a plurality of non-driving wheels A are attached to a lower face whereof, an elevating plate E rotatably journalled to the base portion C through a shaft D, driving wheels G journalled to the elevating plate E through a shaft F, a spring H placed between the elevating plate E and the base portion C so as to press down the elevating plate E, a motor I rotating the elevating plate E against resilient force of the spring H around the shaft D so as to move the driving wheels G from their lower running position in which the driving wheels G contact with the floor face B to their upper storage position in which they aren't contact with the floor face B, and a running sensor detecting a guide tape arranged on the floor face B.

When the elevating plate and the driving wheels move to the lower running position, the spring in the conventional system above extends and gives a predetermined spring or resilient force to the driving wheels as a ground contacting pressure. On the contrary, when the driving wheels move to the upper storage position, the spring shortens and accordingly it is necessary to use a force shortening the spring which is stronger than the ground contacting pressure. As a result, a motor for elevating the driving wheels necessitates a strong force compressing the spring, which force is stronger than the ground contacting pressure.

SUMMARY OF THE INVENTION

Accordingly, it is a purpose of the present invention to provide a driving wheel elevating apparatus in a self-propelled truck, which is adapted to improve a usage structure of the spring giving a ground contacting pressure of the driving wheels, enabling to move the driving wheels to their running position and the storage position by using a motor having the same power as the ground contacting pressure.

PREFERRED EMBODIMENT

The embodiment of the present invention will be explained with respect to the accompanying drawings.

Figure 1:
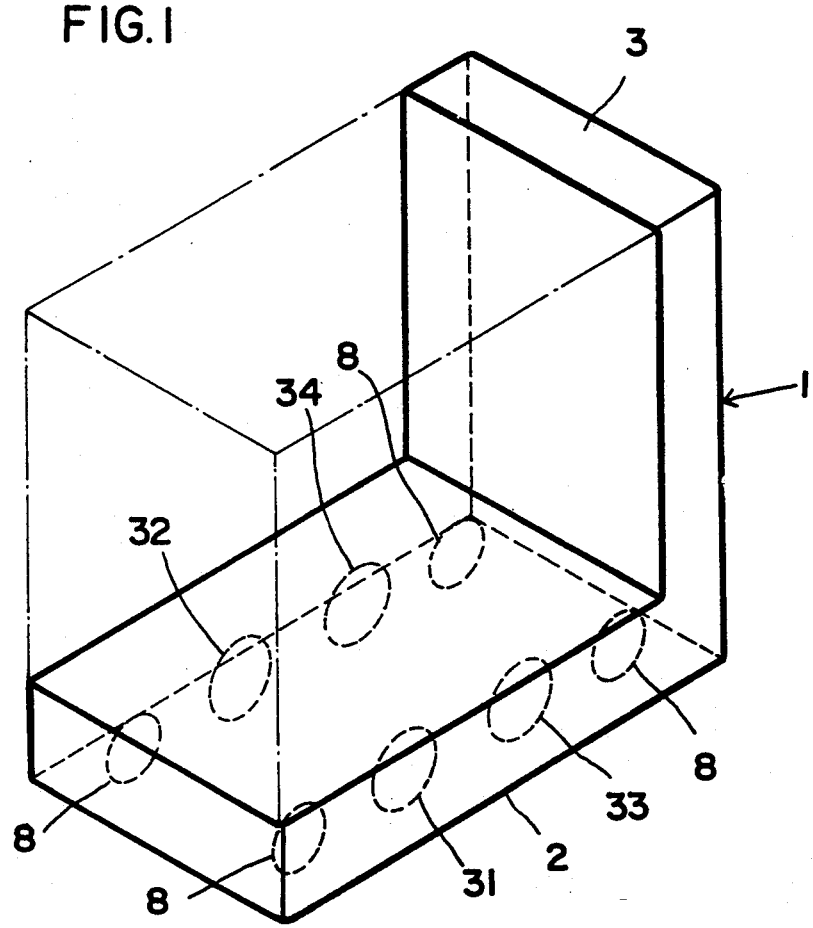
FIG. 1 is a perspective view of a concept of an embodiment of the driving wheel elevating apparatus in a self-propelled truck according to the present invention.
Figure 2:
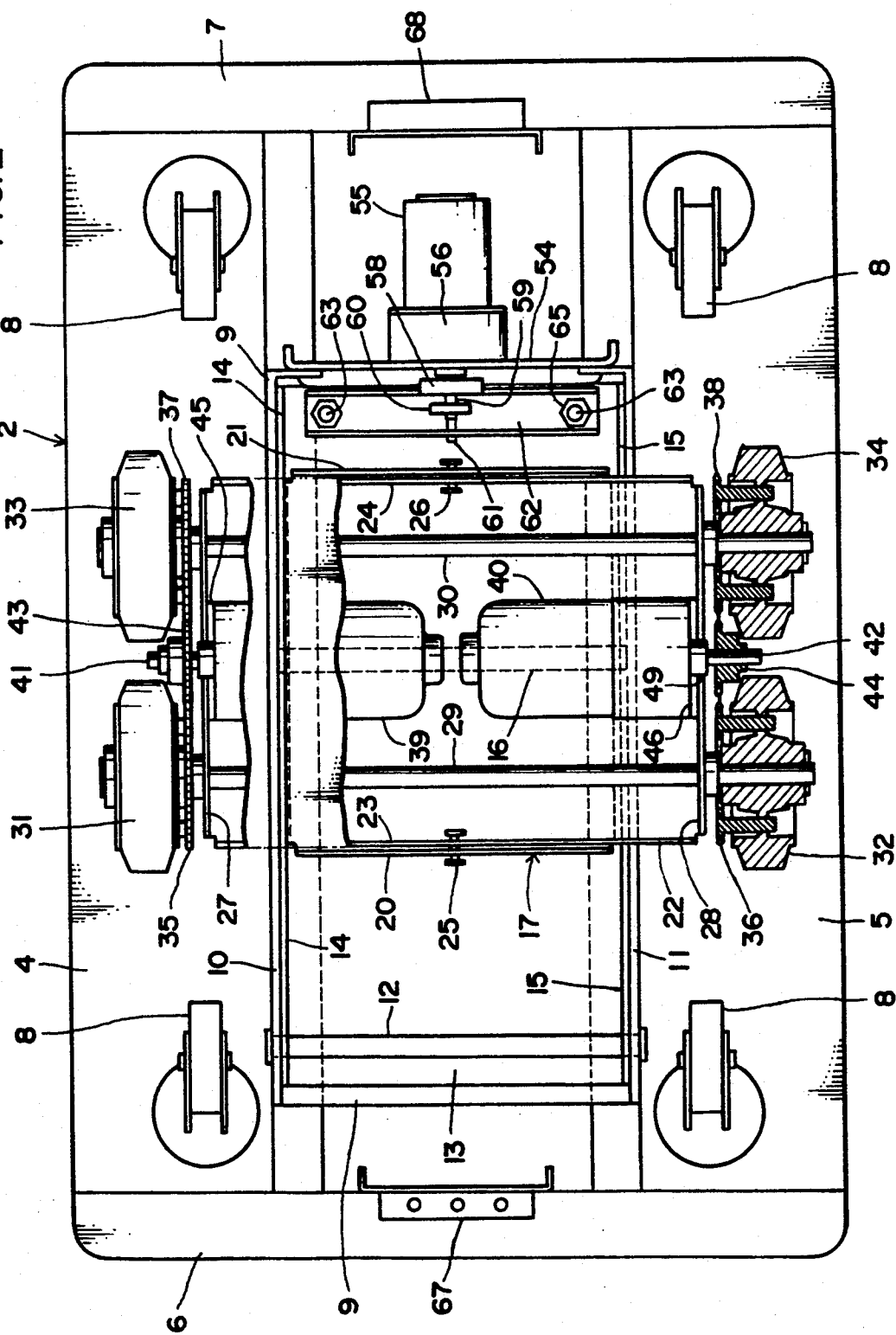
FIG. 2 is a botton view of a base portion of the embodiment of the driving wheel elevating apparatus.

The self-propelled bogie 1 of the present invention consists of the base portion 2 provided with a driving mechanism and an operating portion 3 provided with an operation mechanism. The self-propelled bogie 1 has about a shape of letter L. Load or baggages are placed on the base portion 2 of the bogie 1. The base portion 2 as shown in FIG. 2 consists of a left frame 4, right frame 5, front frame 6, and rear frame 7. Non-driving wheels 8 are attached to the lower faces of four corners of the base portion 2.

Figure 4:
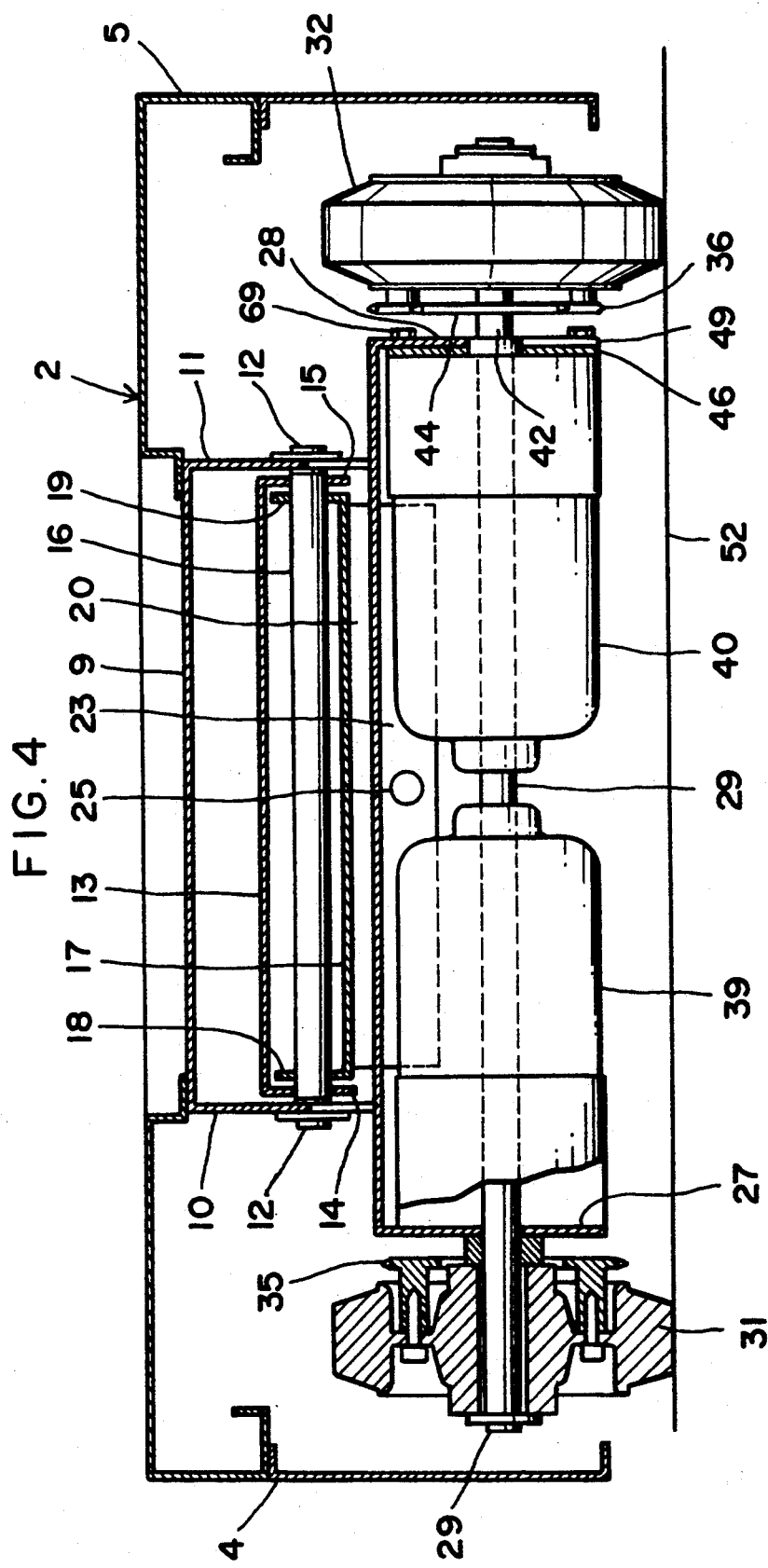
FIG. 4 is a transversal rear view of the base portion.

Between the left and the right frames 4 and 5, a bridge member 9 is fixed. The bridege member 9 has a left and a right walls 10 and 11, respectively extending from the left and the right sides of the bridge member 9 as seen clearly in FIG. 4. Below the bridge member 9, there is the elevating plate 13 similar to substantially a shape of the bridge member 9 and smaller a little in size. A shaft 12 penetrates through the left and the right walls 14 and 15 of the elevating plate 13, and the left and the right walls 10 and 11 of the bridge member 9, so the elevating plate 13 is journalled to the bridge member 9 so as to rotate around the shaft 12. An elevating apparatus 53, the detail of which will be explained later, is connected to a rear end of the elevating plate 13.

An upper side swinging body 17 is placed below the elevating plate 13. The swinging body 17 has a left wall 18 and a right wall 19, respectively extending upward from a left and a right sides of the swinging body 17, and a front wall 20 and a rear wall 21, respectively extending downward from a front and a rear sides of the swinging body 17. A shaft 16 placed in parallel with the shaft 12 passes through the left and the right walls 18 and 19 of the swinging body 17, and the left and the right walls of the elevating plate 13, and the swinging plate 17 is journalled to the elevating plate 13 so as to rotate around the shaft 16. Both ends of the shaft 16 don't reach the left and the right walls 10 and 11.

Below the upper swinging body 17, there is a lower swinging body 22. The low swinging body 22 has a front and a rear plates 23 and 24, respectively extending downward from a front and a rear sides of the lower side swinging body 22. The front and the rear plates 23 and 24 of the lower side swinging body 22 are rotatably connected to the front and the rear walls 20 and 21 of the upper side swinging body 16 through a set of pins 25 and 26 extending along front-and-rear directions.

According to a construction above of the self-propelled bogie truck 1, it is possible that the lower side swinging body 22 to rotate around the front-and-rear pins 25 and 26, and around the left-and-right directioned shaft 16. It is said that the lower swinging body 22 is joined to the base portion 2 so as to universally move.

The left and the right sides of the lower swinging body 22, respectively extend exceedingly sidewise. Both ends of the extended left and the right portions are curved downward forming motor attachment faces 27 and 28. Two wheel shafts 29 and 30 extending along a left-and-right direction are attached to these motor attachement faces 27 and 28. Driving wheels 31, 32, 33, and 34 are loosely fitted at each ends of the wheel shafts 29 and 30. Sprockets 35-38 are fixed to the driving wheels 31-34.

Figure 5:
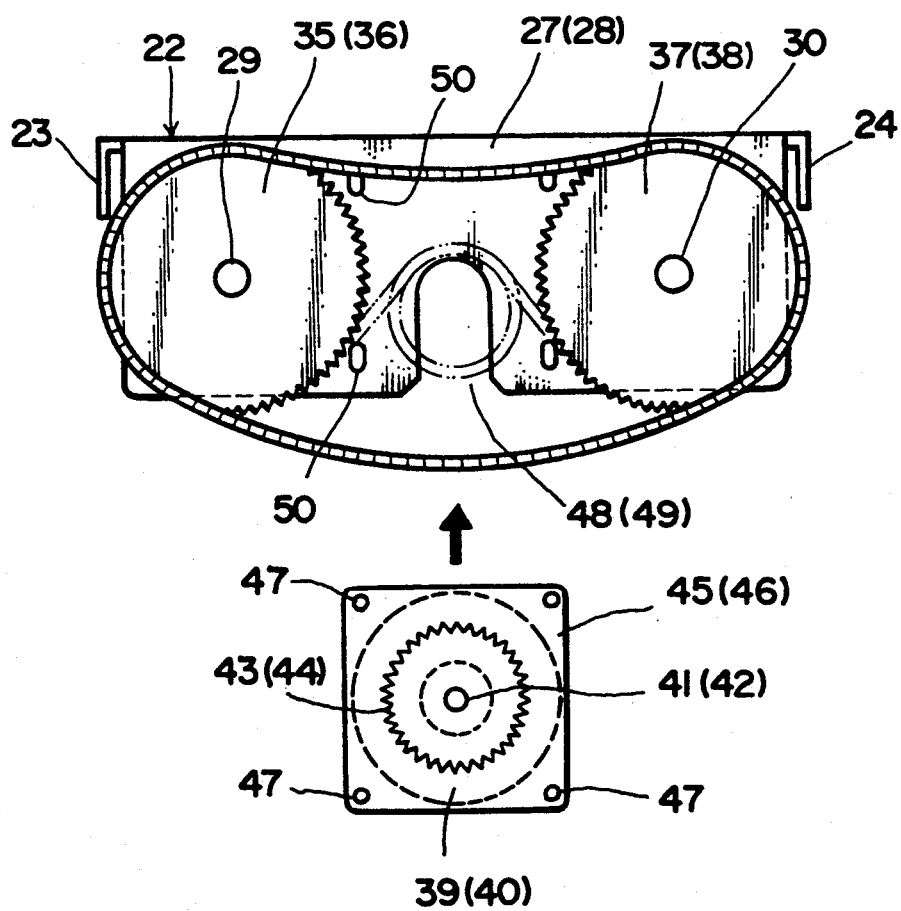
FIG. 5 is a disassembled view of the important portion of the base portion.

Sprockets 43 and 44 are fixed to output shafts 41 and 42 of a pair of left and right of right turning and reverse turning motors 39 and 40. The flanges 45 and 46 of the motors 39 and 40 have, respectively a plurality of through holes 47 as shown in FIG. 5.

The motor attachment faces 27 and 28 have a plurality of oval openings 50 corresponding to these through holes 47 of the flanges 45 and 46, and cut-out portions 48 and 49 through which the output shafts 41 and 42 of the motors 39 and 40 extend. Between the sprockets 35 and 37, and sprockets 36 and 38, chains 51a and 51b extend around them. Then, as shown in FIG. 5, the motors 39 and 40 are inserted upward, a bolt 69 is inserted through the through hole 47 and the oval hole 50, and the reversible motors 39 and 40 are fixed to the motor attachment faces 27 and 28.

Next, the elevating apparatus 53 will be explained in detail.

Figure 3:
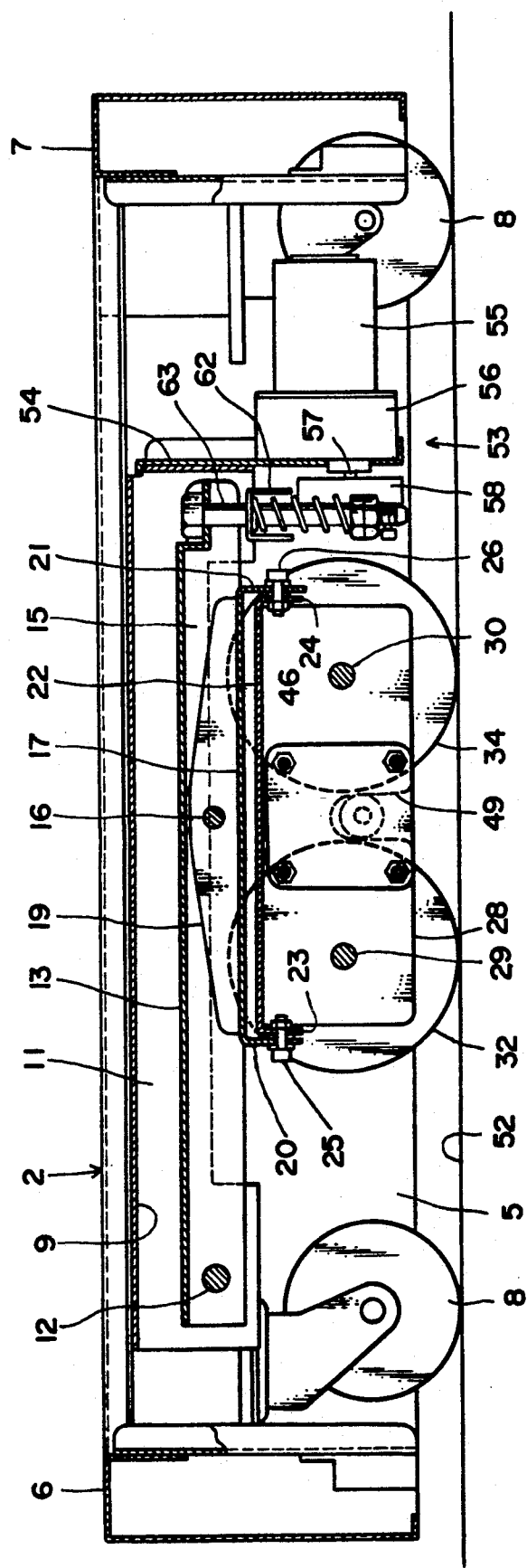
FIG. 3 is a left elevation of the transversal section of the base portion.

A vertical frame 54 is fixed to a rear end portion of the bridge member 9 as shown in FIG. 3. A speed reduction gear box 56 for the motor 55 is secured to the vertical frame 54. Disc-like rotary member 58 is secured to an output shaft 57 of the gear box 56 through a central portion of the rotary member 58 (see FIG. 6 and 7). A pin 59 is planted on an eccentric position of the rotary member 58 and a lower end portion of a link 60 is connected to the pin 59. Upper end of the link 60 is journalled to a pressure rod 62 extending left-and-right direction through a pin 61.

At upper ends of a pair of left-and-right guide bars 63, nuts 64 are threaded. Lower end portions of the guide bars 63 pass from the above through through holes 70 formed at rear ends of the elevating plate 13. When the nuts 64 on the guide bars 63 abut against the elevating plate 13, the guide bars 63 stop. To the lower ends of the guide bars 63, springs 66 fit. Then, double nuts 65 are threaded to the lower ends of the guide bars 63. According to such construction, the nuts 64 press constantly the elevating plate 13 owing to force of the springs 66, so it is not necessary to secure these nuts 64 to the elevating plate 13.

When the motor 55 rotates the rotary member 58, a level of the pressure rod 62 relative to the base portion 2 (bridge member 9) is controlled. When the rotary member 58 stops, the pressure rod 62 is made stable at its controlled position.

Figure 6:
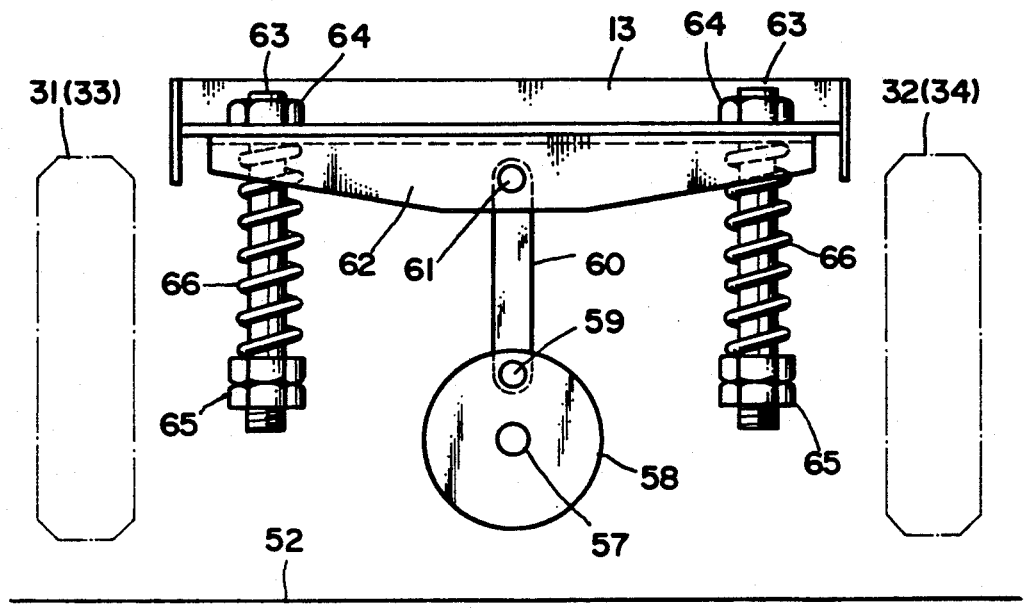
FIG. 6 and FIG. 7, respectively are explanation views of a function of the driving wheel elevating apparatus.

FIG. 6 shows a condition in which the pin 59 of the rotary member 58 stops at its upper dead point and the pressure rod 62 is placed at its most upper position relative to the base portion 2. In this position, the elevating plate 13 abuts against the pressure rod 62 and the elevating plate 13 moves to its most upper position. The driving wheels 31-34 substantially secured to the elevating plate 13 separate from the floor face 52 and are placed or stored in their storage position. Consequently, the base portion 2 is supported on the floor face 52 through non-driving wheels 8, so it is easy to move the truck by hands.

Change of the driving wheels 31-34 from their storage position (FIG. 6) to the running position (FIG. 7) is carried out by rotating the rotary member 58 by the motor 55 descending the pressure rod 62. That is, when a switch (not shown) of the motor 55 mounted on the operation portion 3 is turned on rotating the rotary member member 58, the link 60 moves downward making the pressure rod 62 descend. Consequently, pressure force of the springs 66 make the elevating plate 13 contacting to the pressure rod 62 descend. When the rotary member 58 rotates about a quarter of one revolution, driving wheels 31-34 contact to the floor face 52. When the rotary member 58 further rotates to rotate the pin 59 to its lower dead point or position, the elevating plate 13 doesn't lower because the driving wheels 31-34 are in their contacted position to the floor face 52. However, the pressure rod 62 compresses the springs 66 and lowers taking the condition shown in FIG. 7.

Figure 7:
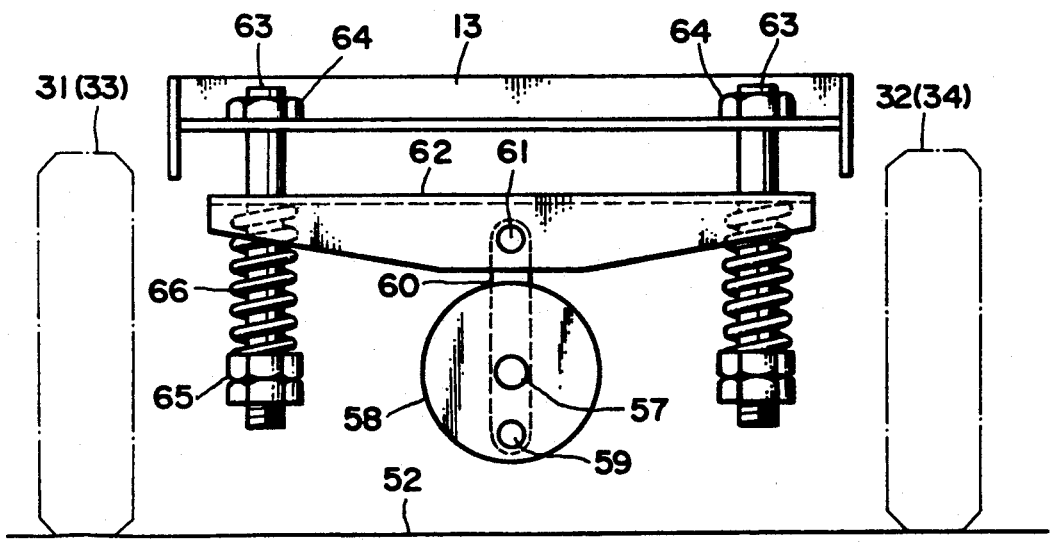
Figure 8:
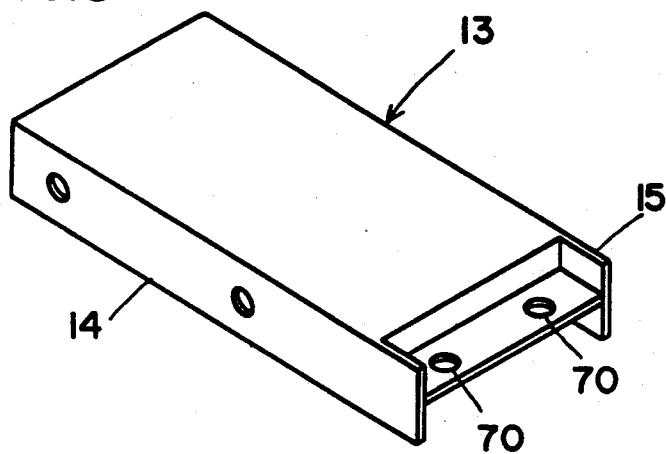
FIG. 8 is a perspective view of the elevating plate.
Figure 9:
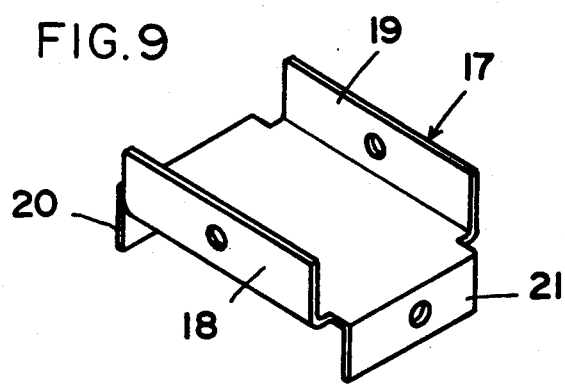
FIG. 9 is a perspective view of an upper swinging member.
Figure 10:
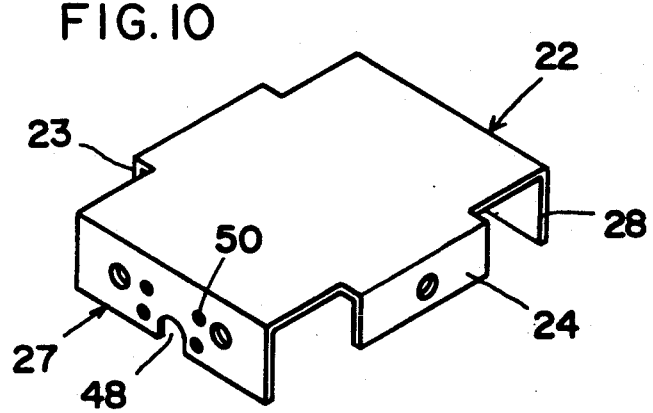
FIG. 10 is a perspective view of a lower swinging member.
Figure 11:
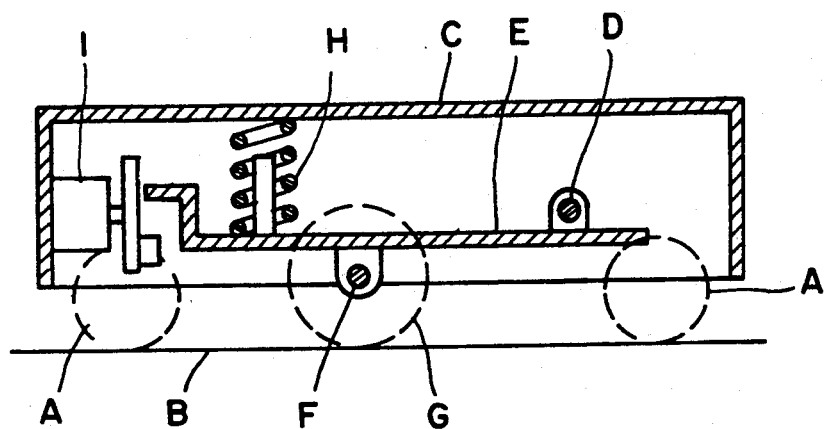
FIG. 11 is a driving wheel elevating apparatus according to the prior art.

Meanwhile, at the condition shown in FIG. 7, the driving wheels 31-34 (elevating plate 13) are pressing onto the floor face 52 due to pressure of the compressed springs 66. Consequently, the springs 66 are designed to give predetermined ground contacting pressure to the driving wheels 31-34 when the springs are compressed as shown in FIG. 7.

The motor 55 is constructed to stop at its upper dead point and the lower dead point by means of a limit switch (not shown) placed near the rotary member 58. These running sensors 67 and 68 mounted on the self-propelled truck 1 detect optically or magnetically optical or magnetic tape formed on the floor face 52.

An operation of the driving wheel elevating apparatus of the present invention will be explained.

When the running sensor 67 of the self-propelled truck 1 of the apparatus is placed at a position above the guide tape on the floor face 52, the switch on the operation portion 3 operates to rotate the motor 55 rotating the rotary member 58 and moving the pin 59 toward its lower dead point, the pressure rod 62 and elevating plate 13 lower while they are contacting to each other. When the rotary member 58 rotates about a quarter of one revolution, the driving wheels 31-34 contact to the floor face 52, but the springs 66 are not compressed.

After the driving wheels 31-34 contact to the floor face 52, the elevating plate 13 doesn't lower and only the pressure rod 62 lowers compressing the springs 66. When the pin 59 comes to its lower dead position, the motor 55 stops as shown in FIG. 7. In this condition shown, sufficient ground contacting force of resilient force of springs 66 compressed by the pressure rod 62 is applied to these driving wheels 31-34. That is, the motor 55 merely compresses the springs 66 by a distance necessitating to attain a necessary or suitable ground contacting pressure after the springs are extended as shown in FIG. 6 having small force, thereby a power necessitating to the motor 55 corresponds to the ground contacting pressure.

Next, when the running control switch of the operation portion 3 is turned on, the motors 39 and 40 are driven and the driving wheels 31-34 rotate along the predetermined direction. The driving wheels trace the guide tape according to a computer program previously stored in an operation portion 3 and the self-propelled truck 1 runs to its destination.

When it is necessary to manually run the gruck 1, the motor 55 rotates the rotary member 58 to move the pin 59 toward its upper dead point as shown in FIG. 7. Then, until the pressure rod 62 moves upward and the rotary member 58 moves or rotates about a quarter revolution, the springs 66 extend in accordance with an raised distance of the pressure rod 62 and the elevating plate 13 doesn't move. When the pressure rod 62 further ascends, the pressure rod 62 abuts against a lower face of the elevating plate 13, then extension of the springs 66 stops, the pressure rod 62 and elevating plate 13 cooperatively ascend. Finally, the driving wheels 31-34 move to their upper storage position as shown in FIG. 6.

As described above, the springs 66 of the self-propelled truck 1 according to the present invention are compressed when the driving wheels 31-34 move to their running positions. While, the driving wheels are extended when they are moved to their storage positions. As a result, it is advantageously not necessary to compress the springs 66 more than the ground contacting pressure necessary to the driving wheels 31-34, so it is possible to minituarize or decrease a rated power of the motor 55 elevating the driving wheels 31-34.

What is claimed is:

1. A self-propelled truck adapted to automatically run along a guide tape installed on a floor face, which truck comprises;
   a base portion having a plurality of non-driving wheels attached to a lower face thereof,
   an elevating plate so as to move vertically relative to said base portion,
   driving wheels attached to said elevating plate at stable relative height positions,
   means for elevating and descending the elevating plate relative to the base portion, and
   springs on the base portion so as to extend when said driving wheels are placed at their upper storage position and to be compressed when said driving wheels are moved to their lower running position giving a ground contacting pressure to the driving wheels.

2. The self-propelled truck according to claim 1, wherein the means for elevating and descending the elevating plate is an electric motor.

3. A self-propelled truck adapted to automatically run along a guide tape installed on a floor face, comprising;
   a base portion provided with a plurality of non-driving wheels attached to a lower face thereof,
   an elevating plate so as to vertically move relative to said base portion,
   driving wheels attached to said elevating plate at stable relative height positions,
   an electric motor attached to said base portion,
   a pressure rod adapted to vertically move due to rotation of said motor, and
   springs installed between said pressure rod and said base portion,
   wherein, when the driving wheels move to their upper storage position, the pressure rod pushes up the elevating plate, and when the driving wheels move to the lower running position, the pressure rod is adapted to push down the elevating plate through said springs.

* * * * *